3,126,339
COMPOSITION OF NYLON AND POLYTETRA-
FLUOROETHYLENE
Louis L. Stott, Wyomissing, Pa., assignor, by mesne
assignments, to Polymer Processes, Inc., Reading, Pa., a
corporation of Pennsylvania
No Drawing. Filed Mar. 10, 1961, Ser. No. 94,670
2 Claims. (Cl. 252—12)

This invention relates to improved load-bearing materials and methods for their manufacture. More particularly, this invention relates to novel load-bearing materials comprised of nylon and polytetrafluoroethylene that have a low coefficient of friction and long wear life.

It is known that polytetrafluoroethylene has a very low coefficient of friction. It is also known that polytetrafluoroethylene is not useful as a bearing material if high loadings are encountered as the wear characteristics of polytetrafluoroethylene under moderate to high loads are poor, resulting in an extremely short life of polytetrafluoroethylene bearings. Nylon, on the other hand, has a low coefficient of friction, although considerably greater than that of polytetrafluoroethylene, but is suitable for bearing applications as it is hard and tough and wears well under heavy loads. Ideally, a bearing material would possess the frictional characteristics of polytetrafluoroethylene but retain the wear resistance of nylon.

Previously, efforts have been made to prepare articles from nylon and polytetrafluoroethylene to obtain the advantages of both materials, but results have been only partially successful. For example, melt mixing has been attempted but it is extremely difficult to obtain a uniform dispersion of polytetrafluoroethylene in molten nylon.

It has been discovered, as described in my co-pending application, Serial No. 756,749, now Patent No. 2,975,-128, filed August 21, 1958, that a sintered nylon article containing polytetrafluoroethylene displays improved properties of friction while not impairing the wear characteristic of the article. In this co-pending application a process is described whereby finely divided nylon (minus 40 microns), prepared by precipitation processes, is mixed with finely divided polytetrafluoroethylene and the resulting mixture pressed under high pressure and then sintered. While advantageous results have been obtained by this process, it inherently is limited to the production of sintered articles. As the pressing operation must be carried out under considerable pressure, the size of the pressed and sintered article is severely limited. Further, as sintering takes place at temperatures below the molten phase of nylon, certain porosity is encountered which, for many applications, is undesirable.

It has now been discovered that polytetrafluoroethylene may be included in nylon to form porous-free cast articles of almost unlimited size, which article has a coefficient of friction materially lower than, and wear life significantly greater than unfilled nylon.

Accordingly, it is an object of this invention to provide a load-bearing material comprised of nylon and polytetrafluoroethylene that has a very low coefficient of friction.

A further object of this invention is to provide a load-bearing material comprised of nylon and polytetrafluoroethylene that has long wear life.

Yet another object of this invention is to provide porous-free castings, of almost unlimited size, from a mixture comprised of nylon and polytetrafluoroethylene.

Briefly, the objects of this invention are obtained by mixing finely divided polytetrafluoroethylene in monomers of nylon and polymerizing the monomers while the polytetrafluoroethylene is uniformly dispersed therein. Generally it has been found that between about ¼% and 40% by weight polytetrafluoroethylene is effective to accomplish these objects.

The present invention finds greatest utility in polymerization processes wherein the time of polymerization is comparatively short and the formation of a solidified article is comparatively rapid. Particularly suitable are recently discovered processes for the polymerization of lactams below the melting tempearture of the resulting polylactams which yields a solid article in a matter of minutes as opposed to conventional polymerization systems that require several hours. By use of these rapid and low temperature polymerization systems, it is relatively easy to maintain polytetrafluoroethylene in a uniform dispersion throughout the lactam as compared to conventional nylon polymerization systems.

Briefly, these rapid, low temperature polymerization processes for lactams are carried out in the presence of an N,N-diacyl promoter and a base catalyst. Suitable catalysts for the base-catalyzed polymerization of polylactams are any of the metals, which can be in metallic, complex, or a compound form, which are capable of forming acids in the "Lewis acid" sense sufficiently strong to form an iminium salt of the lactam, which iminium salt is then the active catalyst of the base-catalyzed polymerization system. Common examples of such catalysts are the alkali and alkaline earth metals, either in combined or metallic form. Other effective catalysts are the organo-metallic derivatives of the foregoing metals as well as of other metals. Examples of such organo-metallic compounds are the lithium, potassium, and sodium alkyls such as butyl lithium, ethyl potassium or propyl sodium, or the aryl compounds of such metals such as sodium phenyl. Other suitable organo-metallic compounds are diphenyl magnesium, zinc diethyl, triisopropyl aluminum, diisobutyl aluminum hydride, etc. As a general class, the materials known as Grignard reagents are effective base catalysts for the present polymerization and are discussed more fully in copending application, Serial No. 729,509, now Patent No. 3,018,273.

Base-catalyzed polymerization of e-caprolactam, for example, is generally carried out with a catalyst concentration ranging anywhere from a small fraction of 1 percent, e.g., 0.01 percent to as much as 15 or 20 mole percent of the e-caprolactam monomer. In general, however, preferred catalyst concentrations will fall between about 0.05 and about 5 mole percent and more preferably still between about 0.1 and about 1 mole percent of the caprolactam monomer.

Suitable promoters for these low temperature polymerization processes may be selected from at least one of the three following groups: N,N-diacyl compounds; ureas, and isocyanates.

Useful N,N-diacyl compounds contain essentially the active group

in which N is a tertiary nitrogen atom (i.e., has no attached hydrogen atoms) and A and B are both acyl radicals and may be selected from the group consisting of carbonyl, thiocarbonyl, sulfonyl, and nitroso radicals. R can be selected from any non-interfering groups, i.e., groups which will not preferentially react with the lactam or which will not otherwise interfere with the essential effective activity of the polymerization catalyst. These N,N-diacyl promoters are fully disclosed in copending application, Serial No. 627,984, now Patent No. 3,017,391.

To preclude the presence of large inert groups being present in the above-described N,N-diacyl promoters it is preferred that the molecular weight of the compound does not exceed about 1000 and more preferably still does not exceed about 500. Urea compounds illustrated by the structural formula

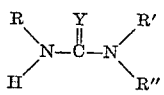

wherein Y is a member selected from the group consisting of O and S; R, R' and R" are monovalent radicals free from reactive groups and R" can be hydrogen; R and R" together can be the divalent tetramethylene group; and R' and R" together can be the divalent polymethylene group $(CH_2)_n$, wherein $n$ is an integer from 2 to 5, are effective promoters for the base-catalyzed polymerization of higher lactams and especially of e-caprolactam at temperatures below 200° C. The cyclic ureas can also have one or more of the hydrogen atoms of the polymethylene groups substituted by monovalent radicals free from reactive groups, as for examples, the hydrocarbyl radicals alkyl, cycloalkyl, aryl, aralkyl, and alkaryl radicals preferably containing less than about 10 carbon atoms. These types of promoters are described in some detail in copending application, Serial No. 765,069, now Patent No. 3,086,962.

The amount of urea promoter compound employed in the instant anionic polymerization process can be varied to contain up to about 20 mole percent based on the higher lactam monomer, as hereinafter more fully illustrated, but generally up to 5 mole percent of the urea promoter compound is ample. Preferably the urea promoter concentration will vary from about 0.05 to about 2 mole percent, and more preferably still from about 0.1 to about 1 mole percent of the higher lactam monomer.

As isocyanate compounds suitable for use according to the process of the invention, there may be mentioned alkyl isocyanates, such as methyl isocyanate, ethyl isocyanate, n-propyl isocyanate, isopropyl isocyanate, n-butyl isocyanate, sec-butyl isocyanate, and higher homologs thereof; aryl isocyanates, such as phenyl isocyanate, tolyl isocyanates, xylyl isocyanates, ethylphenyl isocyanates, phenethyl isocyanate, p-diphenyl isocyanate, etc., diisocyanates such as p-phenylene diisocyanate, 2,4-tolylene diisocyanate, di(p-isocyanatophenyl) methane, 2,2-di(p-isocyanatophenyl) propane, p,p'-diisocyanatodiphenyl, ethylene diisocyanates, N,N-di(isocyanatoethyl)amine, etc.; tri- and polyisocyanates such as 1,3,5-triisocyanatobenzene, 1,3,8-triisocyanatonaphthalene, tri(p - isocyanatophenyl)-methane, 4-(p-isocyanatophenyl) methane, 4-(p-isocyanatobenzyl)-1,3-phenylene diisocyanate, 2,5-di(p-isocyanatophenyl)phenyl isocyanate, 2,4-di(p-isocyanatobenzyl)phenyl isocyanate, etc. Because of their more ready availability and greater simplicity, the hydrocarbyl isocyanates are generally preferred materials. However, heterocyclic isocyanates or isocyanates substituted with or containing other radicals or groups such as carbonyl, carbanyl, alkoxy, ether, sulfonyl, t-amino, or any other non-interfering groups (i.e., groups which will not preferentially react with the lactam to be polymerized, or which will not otherwise interfere with the essential effective activity of the isocyanate promoter or polymerization catalysts) will also be suitable promoters for use according to the present invention.

The concentration of these isocyanate promoters should be between about 0.1 mole percent and about 5 mole percent, based upon the lactam being polymerized. The most effective concentration range lies between about 0.5 mole percent and about 2 mole percent of the lactam, although under some circumstances (for example, when an unusually low molecular weight polymer is desired) concentrations outside of the above-stated ranges can be advantageously used. These isocyanate promoters are disclosed in more detail in copending application Serial No. 749,658, now Patent No. 3,028,369.

It is sometimes desirable in the above-described polymerization processes to include regulating compounds whereby the distribution of molecular weight can be precisely and reproductively controlled. Such compounds to serve as regulators which are useful with the above-described promoters are either primary or secondary amines—i.e., amines having at least 1 hydrogen atom attached to the amino nitrogen atom. Such amines can be either aliphatic or cyclic amines. The aliphatic amines can be either saturated or unsaturated and either normal chain or branched chain. The cyclic amines can be either ones in which the amino nitrogen atom is a part of the ring, i.e., N-heterocyclic amines, or ones in which the rings are merely attached to the amino nitrogen atoms, i.e., as in alicyclic, heterocyclic, or aromatic substituted amines. The secondary amines can be either symmetrical, i.e., containing two identical radicals attached directly to the amino nitrogen atom, or unsymmetrical, the latter group including mixed arylalkyl amines, unsymmetrical alkyl amines, etc.

The primary amines have been found generally more suitable than the secondary amines. In order for the secondary amines to be markedly effective, they should have a basicity greater than that of N-methylaniline.

It should be understood that the term "amine," as used with respect to the present regulators, includes imino compounds, i.e., wherein two of the three bonds attached to the nitrogen atom are attached to the same adjacent atom or group, as well as amino compounds. The term does not, however, include amino or imido nitrogen atoms (as in acetamide, caprolactam and maleimide), in which the nitrogen atoms are adjacent to an acyl radical. Copending application Serial No. 676,419, now Patent No. 3,017,392, discusses these regulators in more complete detail.

The concentration of regulating amine to be used in the present invention is dependent upon the concentration of promoter utilized. In general, the preferred proportions constitute equimolar proportions of the promoter and the regulator. However, considerable deviation from equimolar proportions can be tolerated without losing the desirable effect achieved by the present invention. For example, the molar proportion of regulator to promoter can be varied from as low as about 1:4 to as high as about 2:1 or even higher, although it will generally be preferred to maintain this proportion between about 1:2, and about 1:1. In the cases of promoters or regulators which contain more than one active group, as, for example, 1,2-bis(3-aminopropoxy) ethane, the desired concentration should be determined by assuming the compound to have a molecular weight equal to the actual molecular weight divided by the number of active groups per molecule. Thus, for example, one mole of 1,2-bis(3-aminopropoxyl)ethane will behave as two moles of a monoamine, so that only 0.5 mole of the diamine compound per mole of monofunctional promoter will be required in order to give the aforementioned preferred "equimolar" proportion.

While the sequence of addition of the various required components, i.e., lactam, catalyst, promoter and regulator, is not particularly critical under most circumstances, there are some precautionary measures which must be observed. For example, if the particular catalyst used is one which gives off water when reacted with the lactam (as in the earlier mentioned cases of hydroxide or carbonate catalysts), that water must be removed before addition of the promoters or else the promoters will be rendered inactive.

Using the above-described polymerization systems, it is convenient to include finely divided polytetrafluoroethylene resins in the monomeric material and conduct the polymerization while the polytetrafluoroethylene resins are dispersed therein. Any suitable mixing device is satisfactory to obtain an intimate dispersion of the polytetrafluoroethylene resins in the monomer and, due to the rapidity of the polymerization reaction, little difficulty is encountered in maintaining a uniform dispersion until solidification of the polymer begins. A small quantity of a dispersing agent may be added to the monomer to aid in effecting the dispersion.

In the following examples, three different grades of finely divided polytetrafluoroethylene were used. One had a particle size of 400 to 600 microns, a molecular weight of from 2 to 10 million, and was a granular product with random shape distribution. This product is obtainable from E. I. du Pont de Nemours and is sold under their trade designation TF–1.

Another finely divided polytetrafluoroethylene used is sold under E. I. du Pont de Nemours' trade designation TF–6 which is described as a dispersion grade material of about 0.25 micron having a random shape distribution and a molecular weight of about one million. This material also contains a dispersing agent.

Also in the examples, a polytetrafluoroethylene material sold under E. I. du Pont de Nemours' trade designation 7–X was used that has a particle size of from 5 to 50 microns, a molecular weight of from 2 to 10 million and is in the form of fine, chopped fibers.

In the following examples the test samples were prepared by adding the finely divided polytetrafluoroethylene to epsilon-caprolactam. When polytetrafluoroethylene TF–1 and 7–X were used, triethylene diamine was used as a dispersing agent. In the case of polytetrafluoroethylene TF–6, no additional dispersing agent was used.

The polymerization systems were identical with regard to the samples prepared in the following examples. The finely divided polytetrafluoroethylene resins were thoroughly dispersed in 100 grams of e-caprolactam monomer to which was added a sodium hydride catalyst and a diisocyanate initiator. The reaction was initiated at about 160° C. and, during the polymerization, temperatures did not exceed 200° C. A solid cast article was formed after about three minutes and, prior to such formation, the material undergoing polymerization was agitated to insure a uniform dispersion of the polytetrafluoroethylene particles in the monomer.

The samples were cast in the form of 2″ cylinders from which test specimens were obtained. The test specimens were machined into the form of washers of 1⅝ inches outside diameter and 1⅜ inches inside diameter by about ⅛ inch thick. The samples, after moisture stabilization, were placed on a thrust washer tester manufactured by the Franklin Institute of Philadelphia, Pa., which comprises a rotatable chuck into which the test specimen is inserted and a fixed steel wear plate that may be brought into contact with the specimen. The specimen was rotated at 212 r.p.m. (83.3 linear feet per minute at ¾ inch radius). By changing the force by which the steel wear plate was held in contact with the specimen, varying load conditions were obtained. In the following examples, loadings are measured as the product of applied pressure in pounds per square inch times average linear velocity in feet per second, which for convenience will be referred to as PV load.

*Example I*

Four specimens were prepared by the above procedure and tested at PV's varying from 500 to 10,000. Specimen A contained no polytetrafluoroethylene, specimen B contained 10 percent type TF–1 polytetrafluoroethylene, specimen C contained 20 percent type TF–1 polytetrafluoroethylene, and specimen D contained 10 percent type TF–6 polytetrafluoroethylene. Results were as follows:

| Specimen | Coefficient of Friction at Start | Coefficient of Friction After 3 Hrs. | Weight Loss in Milligrams |
|---|---|---|---|
| 500 PV: | | | |
| A | .21 | .42 | 1.3 |
| B | .20 | .25 | 0.6 |
| C | .19 | .38 | 0.8 |
| D | .22 | .23 | 0.1 |
| 1,000 PV: | | | |
| A | .59 | .83 | 2.6 |
| B | .26 | .33 | 0.5 |
| C | .24 | .38 | 0.5 |
| D | .22 | .22 | 0.0 |
| 2,000 PV: | | | |
| A | .39 | .86 | 3.3 |
| B | .26 | .32 | 2.4 |
| C | .29 | .32 | 0.8 |
| D | .29 | .28 | 0.7 |
| 3,000 PV: | | | |
| A | .58 | [1] .97 | 4.1 |
| B | .29 | .33 | 3.5 |
| D | .25 | .3 | 0.1 |
| 5,000 PV: D | .27 | .36 | 0.2 |
| 7,500 PV: D | .31 | .41 | 1.4 |
| 10,000 PV: D | .30 | .30 | 1.2 |

[1] Discontinued test after 2 hours.

*Example II*

Additional specimens were prepared by incorporating from ¼ percent to 10 percent type 7–X polytetrafluoroethylene in the nylon. The specimen containing 50 percent polytetrafluoroethylene, however, was melt mixed by extrusion. All tests were run at 2000 PV.

| Percent PTFE | Coefficient of Friction At Start | Coefficient of Friction After 3 Hrs. | Weight Loss in Milligrams |
|---|---|---|---|
| 50 | .48 | .42 | 2.45 |
| ¼ | .15 | .39 | 0.1 |
| 2 | .16 | .18 | 1.8 |
| 5 | .19 | .13 | 1.2 |
| 10 | .12 | .13 | 0.1 |

*Example III*

A specimen was prepared including 5 percent type 7–X polytetrafluoroethylene. At the beginning of the run the coefficient of friction was 0.20, after 6 hours it was 0.34, after 18 hours it was 0.38. The run was continued for 43 hours with the coefficient of friction varying between 0.35 and 0.40 throughout the remainder of the run. Total weight loss was 4 mg., an average of about 0.38 mg. per 3 hours.

*Example IV*

A specimen of 100 percent polytetrafluoroethylene was prepared and tested at a PV of 3000. Initial coefficient of friction was 0.15 but the test was discontinued after 34 minutes due to failure of the specimen due to excessive wear.

I claim:

1. A process for the preparation of shaped articles having low coefficient of friction comprising the steps of adding at least ¼% by weight of finely divided polytetrafluoroethylene to a monomeric lactam, uniformly dispersing said polytetrafluoroethylene throughout such lactam, polymerizing said lactam below the melting point of the resulting polylactam while said polytetrafluoroethylene is uniformly held in suspension therein.

2. A process according to claim 1 in which said polytetrafluoroethylene is less than 600 microns.

References Cited in the file of this patent

UNITED STATES PATENTS

| | | |
|---|---|---|
| 2,855,377 | Stott | Oct. 7, 1958 |
| 2,975,128 | Stott | Mar. 14, 1961 |
| 2,998,397 | Riesing | Aug. 29, 1961 |
| 3,013,967 | Rulon-Miller et al. | Dec. 19, 1961 |

FOREIGN PATENTS

| | | |
|---|---|---|
| 767,820 | Great Britain | Feb. 6, 1957 |